United States Patent [19]

Chazenfus et al.

[11] Patent Number: 4,529,950
[45] Date of Patent: Jul. 16, 1985

[54] DIGITAL PHASE AND AMPLITUDE MODULATOR

[76] Inventors: Henri Chazenfus, 127 rue Jeanne d'Arc, 75013 Paris; Jean C. Imbeaux, 69 rue Dunois, 75646 Paris Cedex 13, both of France

[21] Appl. No.: 466,781

[22] Filed: Feb. 16, 1983

[30] Foreign Application Priority Data

Mar. 2, 1982 [FR] France .................. 82 03411

[51] Int. Cl.$^3$ .................. H03C 1/06; H04L 27/04; H04L 27/20
[52] U.S. Cl. .................. 332/9 T; 332/16 T; 332/17; 332/18; 332/21; 332/22; 332/23 R; 332/41; 332/42; 375/42
[58] Field of Search .............. 332/9 R, 9 T, 10, 16 R, 332/16 T, 17, 18, 21, 22, 23 R, 31 R, 31 T, 37 R, 40, 41, 42, 48; 375/42

[56] References Cited

U.S. PATENT DOCUMENTS 3,697,874 10/1972 Kaneko .................. 340/347 DD X
4,433,310 2/1984 Bic et al. .................. 375/42 X

FOREIGN PATENT DOCUMENTS 0031762 7/1981 European Pat. Off. .
1521429 4/1968 France .
2389286 11/1978 France .
WO80/02348 10/1980 World Intel. Prop. Org. .

Primary Examiner—Siegfried H. Grimm

[57] ABSTRACT

A digital phase and amplitude modulator with a code conversion circuit having several digital inputs able to receive digital data and the same number of outputs supplying code converted digital data, a generator of at least one carrier having at least one phase control input and at least one output supplying at least one carrier having a given phase, a digital-analog converter comprising a first stage formed by logic gates having two inputs and one output, one input each of the logic gates being connected to one of the outputs of the code conversion circuit, while the other input is connected to one of the outputs of the generator, and a second stage formed by the same number of transistors as there are logic gates. The modulator also comprises a compensating circuit constituted by at least one supplementary logic gate located in the first stage of the converter, with an input connected to one of the outputs of the code conversion circuit and an output, as well as at least one supplementary transistor located in the second stage of the converter. For at least one of the modulated output voltages, the compensating circuit brings about a displacement to its mean value bringing the latter to the level of the mean value of the other voltages, the modulated output signal then being formed by voltages having different phases and amplitudes, but all centered on a common mean value.

3 Claims, 5 Drawing Figures

DIGITAL PHASE AND AMPLITUDE MODULATOR

BACKGROUND OF THE INVENTION

The present invention relates to a digital modulator with several amplitude levels and d.c. component compensation. It is used in telecommunications and particularly digital transmission.

A known digital modulator is shown in FIG. 1 and comprises:

an input E with two accesses receiving the digital data $d_0$, $d_1$, code conversion circuit 10 with two inputs 10/1, 10/2 connected to two accesses and with two outputs 10/3, 10/4 supplying code converter digital data $a_0$, $a_1$, carrier generator 12 having a phase control input 12/1, connected in the present case to input 10/2 and with an output 12/2 supplying a signal, whose phase is equal to 0 or $\pi$, as a function of the value of $d_1$, a digital-analog converter having two stages, the first being formed by two logic gates 14, 16 (in the present case of the NOR type) having two inputs, respectively 14/1, 14/2 and 16/1, 16/2 and an output, respectively 14/3, 16/3, inputs 14/1, 16/1 being connected to the outputs 10/3, 10/4 of the code conversion circuit 10, and inputs 14/2, 16/2 to the output 12/2 of the generator, the second stage being formed by two transistors 18, 20, whose bases are connected to the outputs 14/3, 16/3 of the logic gates, the collectors to a first supply line 22 raised to a potential Vcc and the emitters to a second supply line 24 raised to a potential $V_{EE}$ across two load resistors 26, 28 of value 3R and R, an output S constituted by a matched load line connected to the first line 22.

This circuit functions in the following way. The carrier generator 12 supplies a square-wave signal, whose frequency is the carrier frequency and whose phase is 0 or $\pi$, as a function of whether $d_1$ is equal to 1 or 0.

The code conversion circuit 10 supplies data $a_0$, $a_1$ defined on the basis of data $d_0$, $d_1$, in accordance with the following table, which also gives the phase of the square-wave signal:

| $d_1$ | $d_0$ | $a_1$ | $a_0$ | Phase | Level |
|---|---|---|---|---|---|
| 1 | 1 | 0 | 1 | 0 | +3 |
| 1 | 0 | 1 | 0 | 0 | +1 |
| 0 | 1 | 1 | 0 | $\pi$ | −1 |
| 0 | 0 | 0 | 1 | $\pi$ | −3 |

The load resistor 26 of transistor 18 controlled via $a_0$ has a 3 times higher value than the load resistor 28 of transistor 20 controlled via $a_1$ (i.e. respectively 3R and R). The two possible amplitude levels at output S are consequently in a ratio of 3. These levels are indicated in relative values in the final column of the preceding table (symbol + corresponding to phase 0 and symbol 0 to phase $\pi$).

FIG. 2 represents the signal obtained at the output of the modulator (at the bottom) as a function of the data values (at the top).

The circuit described hereinbefore is known. The digital-analog conversion part is described in French Pat. publication No. 2454726 corresponding to European Patent Publication No. 80/02348 and the carrier wave modulation part in U.S. Pat. No. 4,433,310.

Such a modulator has the disadvantage of supplying a signal having a d.c. component, because the two voltages forming it do not have the same mean value. Thus, as is clearly apparent from FIG. 2 for $d_1 = d_0$, the mean value of the voltage is v/2, if v designates the maximum amplitude, whereas for $d_1 \neq d_0$, the mean value is equal to $v - v/6 = (5v/6)$.

Thus, apart from the component around the carrier frequency, the spectrum of the modulated signal also has a low frequency component.

These two components of the spectrum are sufficiently spaced apart, when the modulation rate is low compared with the carrier frequency to enable a filter, formed by a simple connecting capacitor, to eliminate the low frequency part of the spectrum without modifying the useful part around the carrier frequency. However, when the modulation rate is no longer negligible compared with the carrier frequency, the low frequency part of the spectrum and the useful part around the carrier frequency overlap. It is then no longer possible to eliminate the low frequency part without distorting the useful part.

BRIEF SUMMARY OF THE INVENTION

The object of the present invention is to eliminate this disadvantage, by supplying a signal modulated at several amplitude levels, which is correctly centred and consequently no longer has an undesirable low frequency spectral component. Provided that a carrier wave having no second harmonic is used, the problems of filtering the modulated signal encountered when using the prior art are eliminated. Therefore, the modulator according to the invention which is of the type described hereinafter, is completed by a circuit for compensating the d.c. component serving to centre the modulated signal. The principle of this circuit consists of superimposing on the non-centred signal, a d.c. component which varies as a function of the data, i.e. as a function of the emitted amplitude level, in such a way that the resulting signal is always centred about the mean d.c. component. More specifically, in the case of the signal shown in FIG. 2, the mean d.c. level is v/2 when the alternative amplitude is v and 5v/6 when the alternative amplitude is v/3. It is possible to recentre the signal by reducing the d.c. component by $5v/6 - v/2 = v/2$ when the alternative amplitude is v/3, i.e. when $a_1 = 1$.

Another solution would consist of increasing the d.c. component of the signal obtained when $a_1 = 1$ by v/3.

In order to obtain this displacement, a supplementary element is used in the logic stage controlled by $a_1$ (or $a_0$), as well as a transistor in the conversion stage for adding the d.c. recentering component.

More specifically, the present invention relates to a digital modulator of the type described hereinbefore, wherein it also comprises a compensating circuit constituted by at least one logic gate located in the first stage of the converter, said gate having an input connected to one of the outputs of the code conversion circuits and an output, as well as at least one supplementary transistor located in the second stage of the converter, said transistor having a base connected to the output of the supplementary gate, a collector connected to the first supply line and an emitter connected to the second supply line by a resistor of appropriate value, whereby for at least one of the modulated output voltages, said compensating circuit brings about a displacement of its mean value bringing the latter to the level of the mean value of the other voltages, the modulated output signal then being formed by voltages having different phases and amplitudes, but all centered on a common mean value.

DESCRIPTION OF THE DRAWINGS AND PREFERRED EMBODIMENTS

Figure 4:
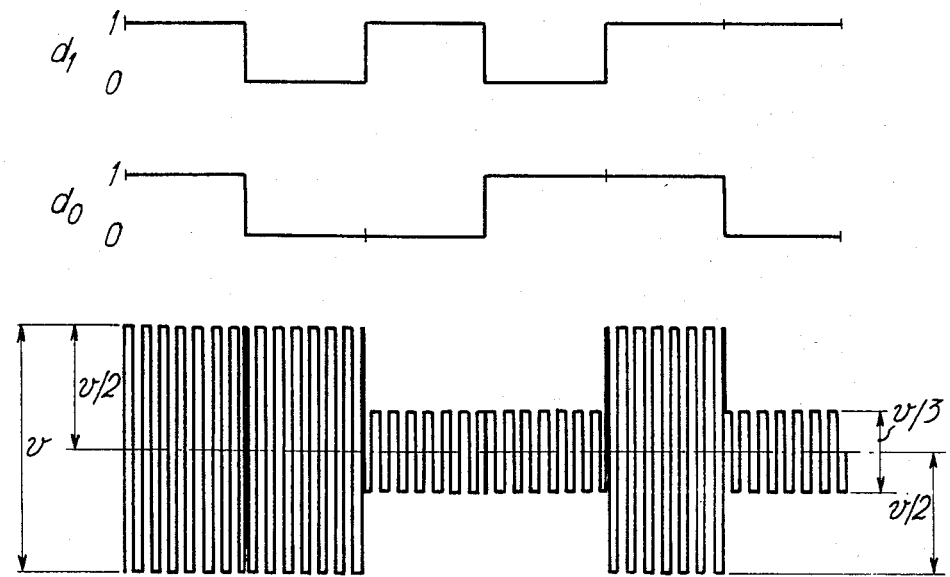
FIG. 4 shows waveforms related to the circuit of FIG. 3.

The invention is described in greater detail hereinafter relative to non-limitative embodiments and with reference to the attached FIGS. 3 to 5.

Figure 1:
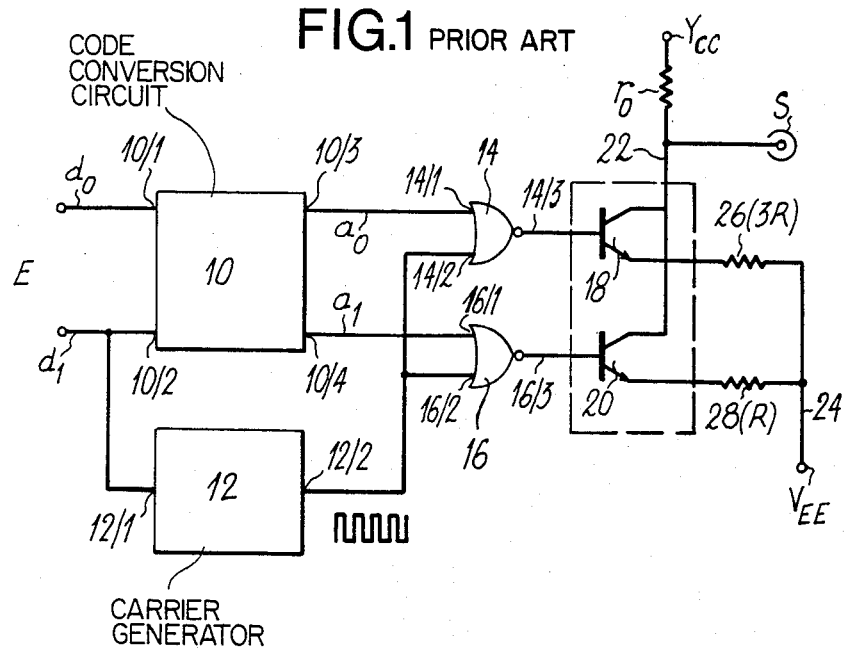
FIG. 1 shows a prior art digital modulator described hereinbefore.
Figure 2:
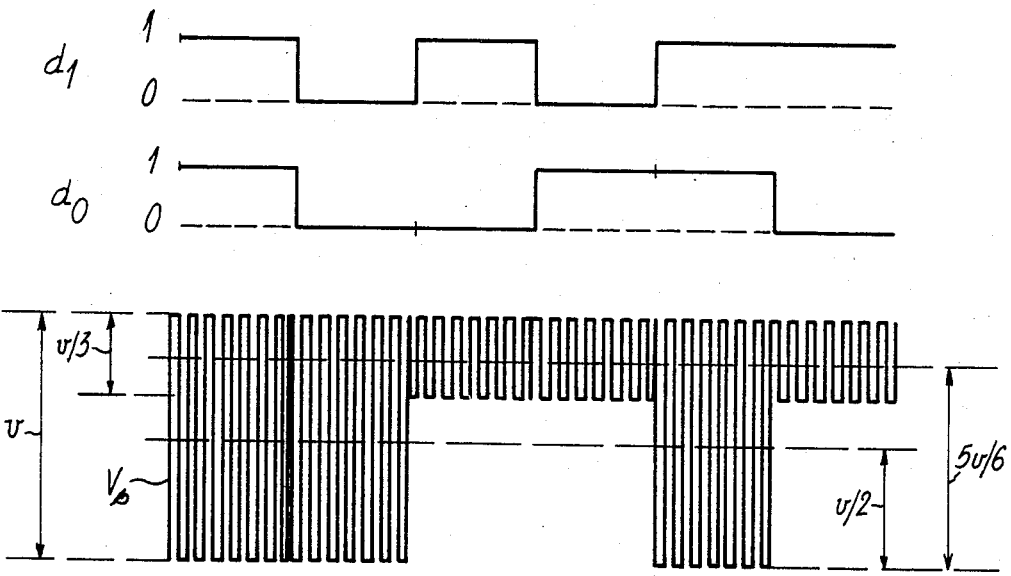
FIG. 2 shows waveforms related to the circuit of FIG. 1.
Figure 3:
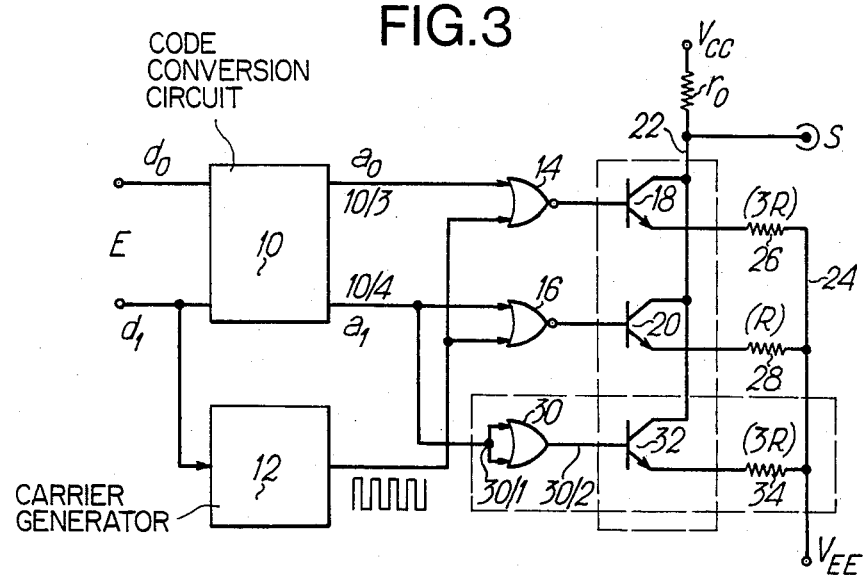
FIG. 3 shows a digital modulator for modulation at 4 antipodal levels.

The circuit according to the invention is shown in FIG. 3 in the case of a modulation at 4 antipodal levels. This circuit contains all the means already illustrated in FIG. 1. Additionally and in accordance with the invention, it comprises a compensating circuit which, in the illustrated case, comprises a supplementary logic gate 30 of the OR type (whereas gates 14 and 16 are of the NOR type) controlled by $a_1$, as well as a transistor 32. The latter has a base connected to output 30/2 of gate 30, a collector connected to the first line 22 and an emitter connected to the second line 24 via a load resistor 34 of value 3R, i.e. of the same value as the load resistor 26 associated with transistor 18 and gate 14 controlled by $a_0$. The current supplied by transistor 32 when $a_1$ is at 1 corresponds to a d.c. output voltage equal to v/3 on matched line S. The mean level of the output signal is consequently brought to the mean level of the voltage obtained when $a_1 = 0$, as is shown in FIG. 4.

Naturally, and as indicated hereinbefore, it is also possible to act on the voltage of amplitude v by raising it by $+v/3$. It is also possible to displace the voltage of amplitude v by $+v/6$ and the amplitude voltage $v/3$ by $-v/6$.

The d.c. component compensation principle is applicable to a random number of amplitude levels. It therefore applies to all the amplitude digital modulations, no matter whether on a single carrier, or on two carriers in quadrature.

Figure 5:
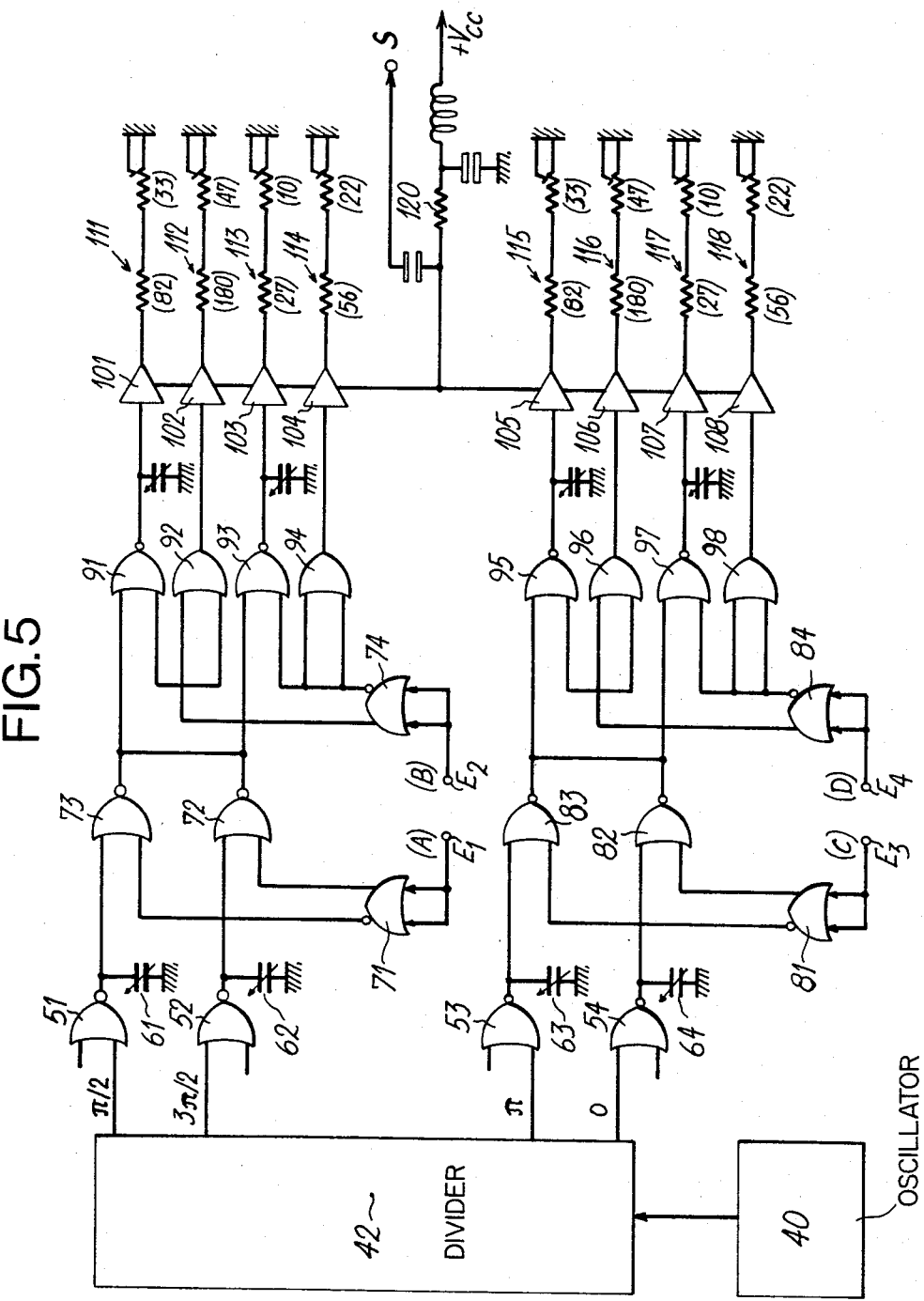
FIG. 5 shows a digital modulator for double amplitude modulation at 4 levels on two carriers in quadrature.

As a supplementary example, FIG. 5 shows an embodiment of a modulator for transmission in double amplitude modulation at 4 levels on two carriers in quadrature (2MA4Q modulation) whose principle (without compensation) is described in the aforementioned U.S. Pat. No. 4,433,310.

The illustrated embodiment uses ECL logic integrated circuits. The circuit shown firstly comprises an oscillator 40 operating at 280 MHz, followed by a divider by four 42 supplying four voltages in quadrature at a frequency of 70 MHz. The circuit then comprises a first stage constituted by two gates 51 and 52, provided with two variable capacitors, a gate 71 connected to a first input $E_1$, two modulation gates 72, 73 having two inputs receiving on the one hand the carrier with a phase of $\pi/2$ and $3\pi/2$ and on the other hand the digital data A applied to an input $E_1$, a gate 74 having an input connected to a second input $E_2$ receiving a second digital data B, and with two supplementary outputs, four gates 91 to 94, provided with four transistorized circuits 101 to 104, whereof the outputs are connected to earth by four resistors 111 to 114, each having a fixed resistor and a potentiometer.

The modulator comprises a second stage which is identical to the first, but which operates with signals of phase 0 $\pi$ supplied by circuit 42. Thus, there are two gates 53, 54, associated with two variable capacitors 63, 64, a gate 81 connected to an input $E_3$ receiving digital data C, two modulation gates 82, 83, a gate 84 connected to a fourth input $E_4$ receiving fourth digital data D, gates 95 to 98 and four output circuits 105 to 108 associated with four sets of resistors 115 to 118.

This circuit functions in the following manner.

Circuit 42 (which is e.g. of type 100131 produced by FAIRCHILD) carries out a division by 4 of the frequency of the signal supplied by oscillator 40 and supplies four 70 MHz signals phase displaced by $\pi/2$ (i.e. o, $\pi/2$, $\pi$, $3\pi/2$). The phases are accurately regulated by variable capacitors 61 to 64 placed at the output of gates 51 to 54, which can be of type 1662 produced by the MOTOROLA company.

The four bits A, B, C and D resulting from a coding of the data, define one state of the modulated carrier chosen from among 16 possible states. Bit A makes it possible to select $\pi/2$ or $3\pi/2$ and bit B determines the amplitude of the carrier by acting on gates 91 and 93, which control the output stages (the latter can be of type 100122). The levels are regulated by potentiometers in series with the load resistors ($27 + 10\Omega$ for level 3, $82 + 33\Omega$ for level 1). A d.c. component compensating circuit is associated with each carrier amplitude level. Bit B also acts on the compensating circuits through gates 92 and 94, which are of type 1664 and the corresponding output stages. The $108\Omega$ resistor 112 and the $47\Omega$ series potentiometer determine the compensation when level 3 is emitted. the $56\Omega$ resistor 114 and the $22\Omega$ series potentiometer determine the compensation, when level 1 is emitted.

The same means are found on the channel in quadrature (carries of phase 0 or $\pi$), controlled by bits C and C.

The centered output signal is collected at the terminals of load resistor 120 (value 50 Ohms) connected to the collectors of output circuits 101 to 108.

What is claimed is:

1. A digital modulator comprising a code conversion circuit having several digital inputs able to receive digital data and with the same number of outputs supplying code converted digital data, a generator of at least one carrier having at least one phase control input and at least one output supplying at least one carrier having a given phase, a digital-analog converter comprising a first stage formed by logic gates having two inputs and one output, one input of each of the logic gates being connected to one of the outputs of the code conversion circuit, while the other input is connected to one of the outputs of the generator and a second stage formed by the same number of transistors as there are logic gates, each transistor having an emitter, a base and a collector, the base of each transistor being connected to the output of a respective logic gate, all the collectors are connected to a first supply line, all the emitters are connected across load resistors of different values to a second supply line, the output being constituted by a matched load line connected to the first supply line, said modulator supplying an output signal formed by voltages having a frequency equal to the frequency of a carrier supplied by the generator, having a phase determined by the digital data and an amplitude determined by the code converted data, whereby the different amplitudes which can be assumed by these voltages have different mean values, said modulator also comprising a compensating circuit constituted by at least one supplementary logic gate located in the first stage of the converter, said supplementary gate having an input connected to one of the outputs of the code conversion circuit and an output, as well as at least one supplementary transistor located in the second stage of the converter, said supplementary transistor having a base connected to the output of the supplementary gate, a collector connected to the first supply line and an emitter connected to the second supply line by a resistor of appropriate value, whereby for at least one of the modulated output voltages, said compensating circuit brings about a displacement of its mean value bringing the latter to the level of the mean value of the other voltages, the modulated output signal then being formed by voltages having different phases and amplitudes, but all centered on a common mean value.

2. A digital modulator according claim 1, wherein said modulator has four antipodal amplitude levels, and the emitter of said supplementary transistor is connected to the second supply line by a resistor whose value is equal to that of the resistor connected to the transistor corresponding to the other output of the code conversion circuit.

3. A digital modulator according to claim 1, wherein the generator supplies two carriers in quadrature and wherein the second stage performs an amplitude modulation with 4 or 8 levels per carrier.

* * * * *